Jan. 12, 1943.  C. J. BALLASH  2,308,348
STOCK FEEDING AND GRIPPING MECHANISM
Filed Sept. 9, 1939  3 Sheets-Sheet 3

INVENTOR.
CLARENCE J. BALLASH
BY
Kwis Hudson & Kent
ATTORNEYS

Patented Jan. 12, 1943

2,308,348

UNITED STATES PATENT OFFICE 2,308,348

STOCK FEEDING AND GRIPPING MECHANISM

Clarence J. Ballash, South Euclid, Ohio, assignor to The Warner & Swasey Company, Cleveland, Ohio, a corporation of Ohio Application September 9, 1939, Serial No. 294,146

16 Claims. (Cl. 29—62)

This invention relates to a stock feeding and gripping mechanism for a machine tool, and more particularly to the means for operating and controlling said stock feeding and gripping mechanism.

An object of the invention is to provide an improved and novel stock feeding and gripping mechanism which can be operated and controlled in an efficient and effective manner.

Another object is to provide means for operating and controlling a stock feeding and gripping mechanism and wherein the operation of said mechanism is initiated manually by the operator, but thereafter continues until automatically stopped upon the stock being gripped or released.

Another object is to provide means for controlling and operating a stock feeding and gripping mechanism which includes hydraulic means for operating the stock gripping jaws and electrical means for controlling said hydraulic means.

Another object is to provide in the control means for a stock feeding and gripping mechanism provision for indicating directly in pounds or other suitable values the gripping pressure of the stock gripping jaws on the work.

Another object is to provide in the control means for a stock feeding and gripping mechanism means for regulating the gripping pressure of the stock gripping jaws on the work for a predetermined maximum grip and for regulating or varying the gripping pressures between said maximum gripping pressure and a minimum or light gripping pressure.

Another object is to provide in an operating and control system for a stock feeding and gripping mechanism means such as a signal light, for instance, for visually indicating that the system is functioning.

Further and additional objects and advantages not referred to before will become apparent hereinafter during the detailed description which is to follow of an embodiment of the invention that is illustrated in the accompanying drawings wherein.

Figure 1:
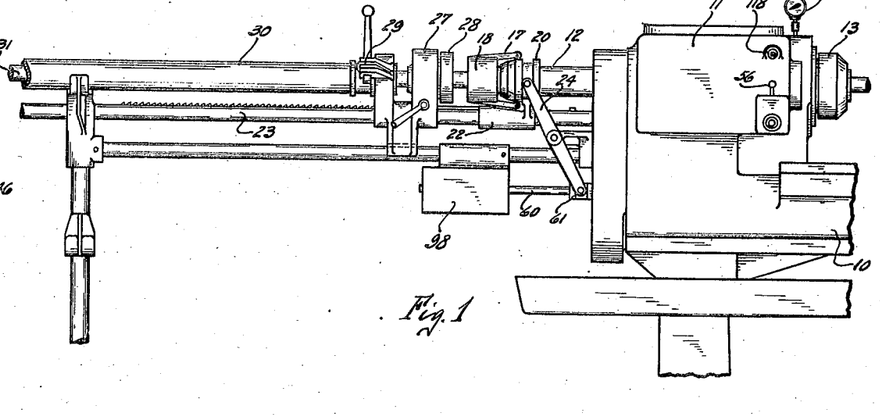
Fig. 1 is a fragmentary front elevational view of a portion of a machine tool and stock feeding and gripping mechanism therefor.

Referring to Fig. 1 there is shown a portion of a bed 10 of a machine tool, at one end of which is a headstock 11. In this instance the machine tool is a turret lathe and the headstock rotatably supports a work spindle 12 that extends through the headstock and has threadedly connected at its enlarged end and exteriorly of the headstock a hood 13 for the collet jaws 14. As is well understood in the art, the hood 13 is provided with a conical bore or opening providing a camming portion cooperating with a complementary conical portion of the collet jaws 14 so that when said jaws and collet are moved endwise the jaws are either cammed inwardly to grip the work stock or are free to spring outwardly under their inherent resiliency to release the stock as is well understood in the art.

A sleeve 15 is located within the bore of the spindle 12 and has one of its ends in engagement with the rear end of the collet, wherefore axial movement of the sleeve in one direction moves the collet and its jaws to effect a camming of the jaws into stock gripping relationship. The opposite end of the sleeve 15 which projects beyond the spindle is provided with an annular shoulder 16 that is engaged by the heel of the fingers 17 that are pivotally mounted in a finger support 18 that has threaded engagement with the end of the spindle and can be locked to the spindle by means of a set screw 19 (see Fig. 3).

A shiftable cone 20 for actuating the fingers 17 is freely mounted on the spindle and can be moved axially thereof to spread the fingers apart to cause the heels of the fingers to move the sleeve 15 endwise to cam the collet jaws into stock gripping relationship. The gripping pressure of the jaws on the work can be varied by adjusting the finger support 18 to vary the movement of the sleeve 15 under the action of the fingers, as will later be further explained. It will also be understood that a greater force will be required for shifting the cone for a heavy gripping pressure of the jaws than for a light gripping pressure thereof. The cone is provided with an annular groove 21 into which extends an arm formed integral on a sleeve 22 that is slidably supported on a rod 23. The groove 21 also receives the ends of a pair of lever arms 24 that are pivotally mounted intermediate their ends on a bracket 25 secured to the headstock. It will be noted that rocking of the lever arms 24 will effect an endwise movement of the cone 20 and that such endwise movement of the cone 20 will, in turn effect an endwise movement of the sleeve 22 on the rod 23.

Figure 2:
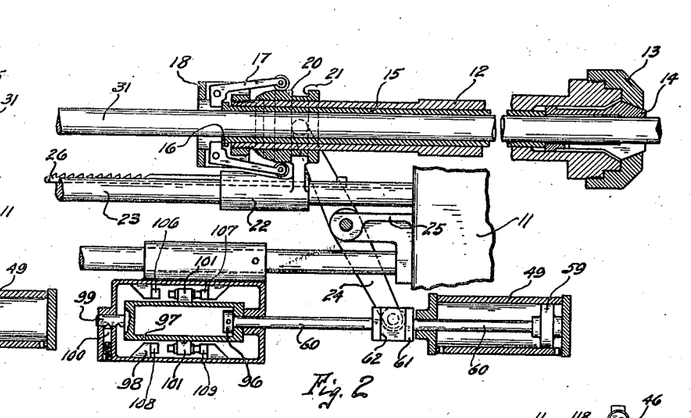
Fig. 2 is a fragmentary developed view partly in section and on an enlarged scale, the stock gripping jaws being shown in closed or gripping position.
Figure 3:
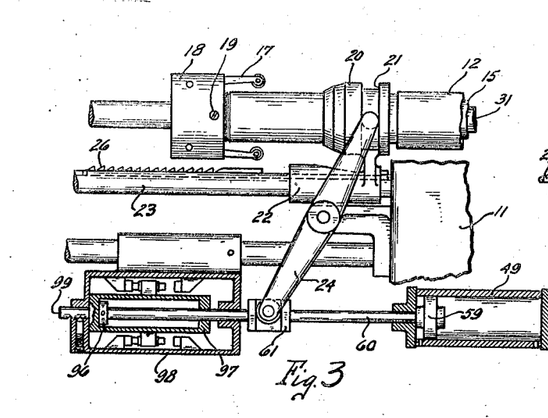
Fig. 3 is a view similar to Fig. 2 but showing certain of the parts in their relative positions when the stock gripping jaws are in released position, said jaws and the front portion of the spindle being omitted in this view.

The rod 23 is provided with an elongated groove in which is slidably mounted a ratchet bar 26, the right-hand end of which, as viewed in the drawings, being provided on its upper side with an elongated recess of greater length than the sleeve 22 and forming spaced abutting shoulders with which the sleeve cooperates when moved by the movement of the cone 20 (see Figs. 2 and 3.)

The rod 23 and ratchet bar 26 pass through a depending portion of a slide 27 which rotatably carries the usual stock holding chuck 28 and also connecting means 29 for connecting the slide 27 to the stock tube 30 (see Fig. 1). The slide 27 is provided interiorly with a pawl (not shown) that cooperates with the ratchet bar 26, such that when the ratchet bar moves in a right-hand direction the pawl will engage the teeth of the bar and effect a shifting movement of the slide 27, the stock tube 30 and stock 31 which extends through the tube and the spindle, all as will be well understood in the art. It will, of course, be understood that when the ratchet bar moves in a left-hand direction the pawl will simply idle over the teeth of the ratchet bar.

As previously explained, the ratchet bar is provided on its upper side with an elongated recess providing abutting shoulders between which the sleeve 22 has independent movement.

Referring to Fig. 2, wherein the cone 20 is shown in stock gripping position, it will be noted that when the cone 20 is moved to the right to release the stock, the first part of this movement of the cone moves the sleeve 22 without effecting any movement of the ratchet bar 26. When the cone 20 has moved out of engagement with the fingers 17 and the stock has been completely released, the right-hand end of the sleeve 22 engages the right-hand shoulder of the ratchet bar, so that the continued movement toward the right of the cone and sleeve effects a movement of the ratchet bar in the same direction and such movement results in an endwise feeding movement of the stock as has been just explained. When the cone 20 is moved in the opposite direction, that is, toward the left from the position shown in Fig. 3, the first part of the movement brings the sleeve 22 into abutting relationship with the left-hand shoulder of the ratchet bar, and then the continued movement of the cone and sleeve toward the left to effect a gripping of the stock, serves to restore the ratchet bar to its former position, it being understood that the pawl carried by the slide 27 idles over the teeth of the ratchet bar during this movement as explained above.

The structure heretofore described herein is old and well known in the art and need not be explained in further detail and forms per se no part of the present invention.

The present invention relates to means for operating and controlling a stock feeding and gripping mechanism such as has been explained above, or a stock feeding and gripping mechanism similar in function but perhaps differing in structure. The present invention contemplates an operating and control means for a stock feeding and gripping mechanism which employ both hydraulically and electrically operated devices for effecting the operation and control of the stock feeding and gripping mechanism.

Figure 4:
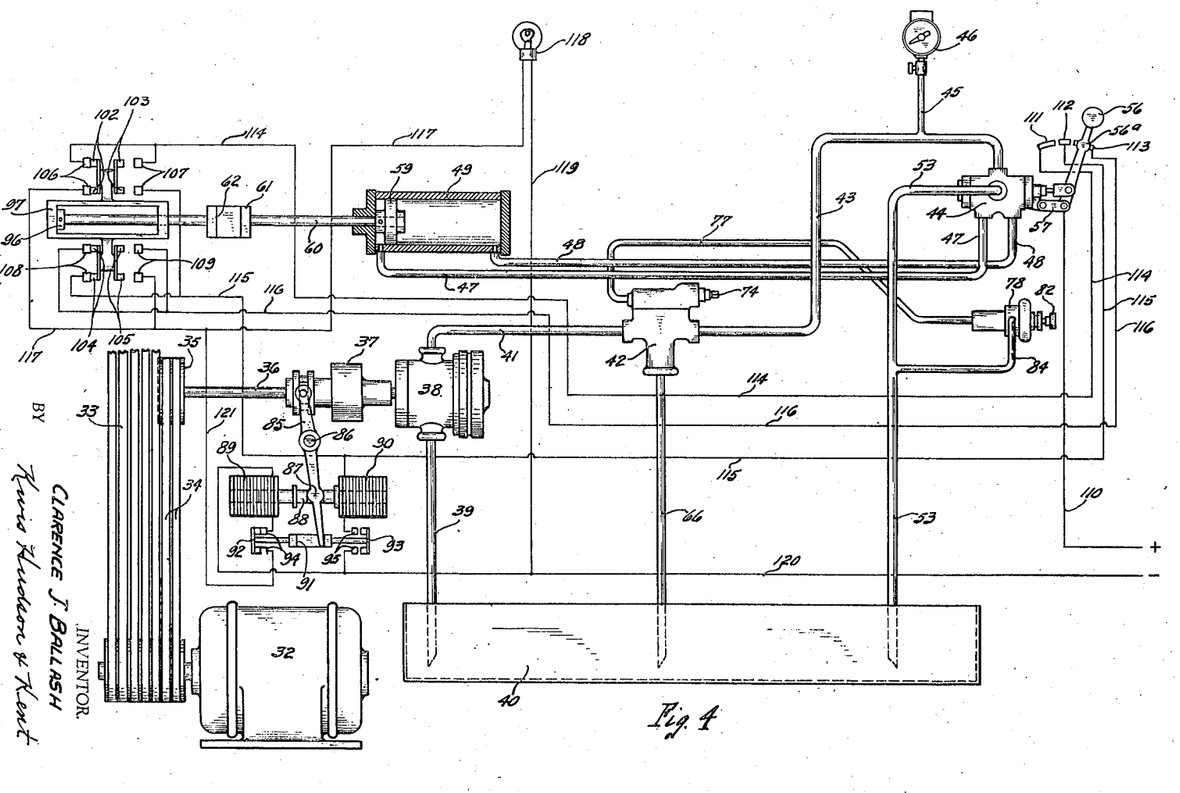
Fig. 4 is a diagrammatic illustration of the operating and control system for the stock feeding and gripping mechanism.

A suitable source of power, such for example as the main operating motor for the machine tool, can be employed for driving the pump of a hydraulic system forming a part of the operating and control means for the stock feeding and gripping mechanism. The electric motor is indicated in Fig. 4 at 32 and is operatively connected with the main drive shaft (not shown) of the machine tool by means of a series of belts 33. The motor 32 is also connected by a second series of belts 34 to a pulley 35 fixed on a shaft 36 which can be operatively connected and disconnected through a clutch 37 with the drive shaft of a hydraulic pump 38 of any suitable and well known construction, and hence not illustrated in detail herein, it being understood that the pump will be of sufficient capacity to fully provide for the maximum gripping pressure. The pump 38 is connected by means of a conduit 39 with a suitable fluid reservoir 40. An outlet pipe 41 connects the pump with a control device, indicated generally at 42 and later to be described in detail. The control device 42 is connected by means of a suitable pipe or conduit 43 with a manually operated control valve 44. The pipe 43 is connected by a lateral pipe 45 intermediate the control device 42 and the control valve 44 with an indicating device 46, later to be described in greater detail, and designed to indicate in pounds the varying gripping pressures of the collet jaws on the work. The pipe 43 communicates with the chamber of the control valve 44 intermediate the ends of said chamber, while pipes 47 and 48 communicate with the chamber of the control valve at points intermediate the pipe 43 and the ends of said chamber, as clearly shown in Fig. 9. The pipes 47 and 48 extend to and are in communication with the opposite ends of a hydraulic cylinder 49, as clearly indicated in Figs. 4 and 6. The control valve 44 comprises, in addition to the valve housing and the valve chamber, a slidable valve body 50 provided with longitudinally spaced lands 51 located a short distance inwardly of the ends of the body 50 and always located on opposite sides of the inlet 43.

Figures 6, 7, 8, 9:
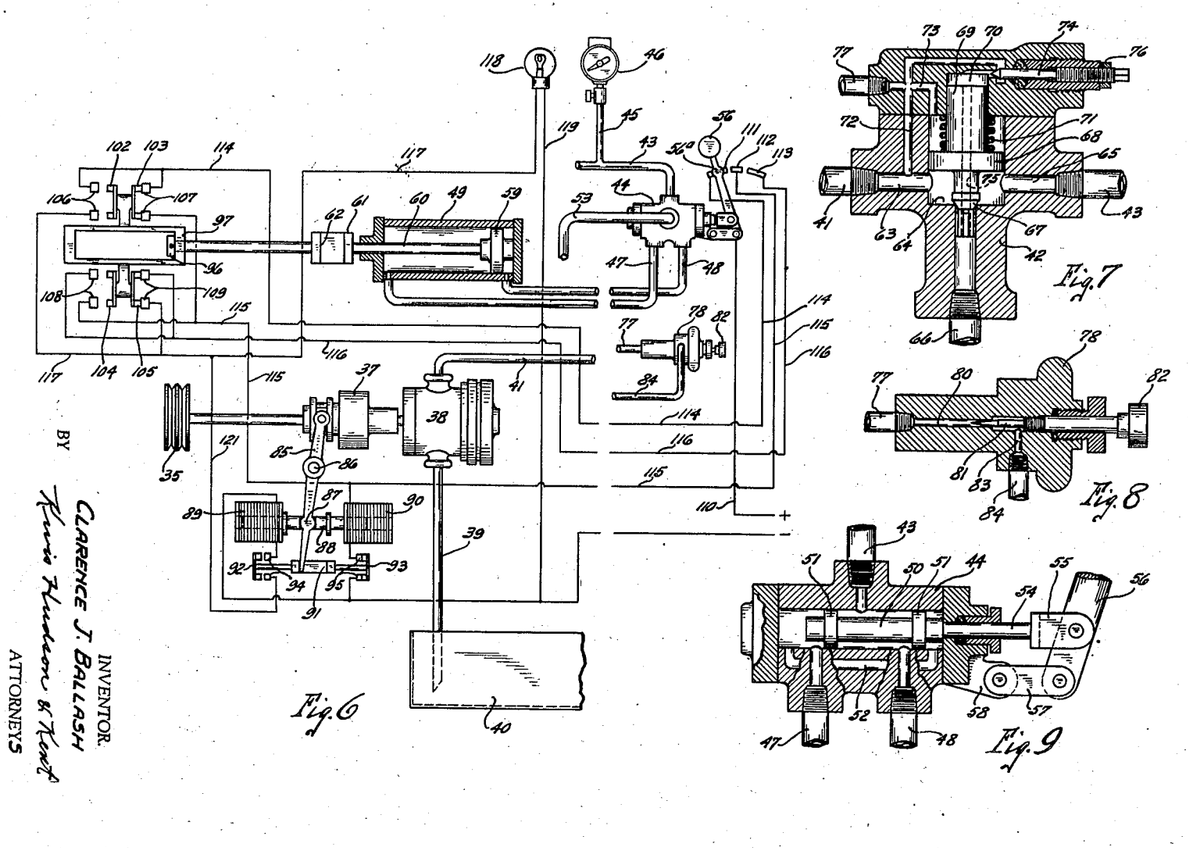
Fig. 6 is a view similar to Fig. 4 but shows certain of the parts in a different operative relationship and omits other of the parts.
Fig. 7 is a detached sectional view on an enlarged scale of the maximum pressure control shown in Fig. 4.
Fig. 8 is a detached sectional view of the pressure control shown in the hydraulic systems in Figs. 4 and 6 for regulating the gripping pressures below maximum gripping pressure.
Fig. 9 is a detached sectional view of the main control valve of the hydraulic system as illustrated in Figs. 4 and 6.

When the valve body 50 is in the position shown in Fig. 9, which represents its limit of travel in one direction, i. e., to the right as shown in said view, the inlet 43 is in communication with the pipe 48, while the portions of the valve chamber to each side of the lands 51 are in communication with the pipe 47, it being noted that the opposite ends of the valve chamber are connected by an exhaust passage 52.

It will be well to point out at this time that an exhaust pipe 53 connects the valve with the reservoir 40 and that this pipe is in communication with the passage 52 but does not appear in the sectional view of Fig. 9, since said exhaust pipe is located at the front side of the control valve as viewed in Fig. 4.

When the valve body 50 is in the position shown in Fig. 9 it will be understood that the fluid exhausted from the cylinder 49 and entering the valve chamber from the pipe 47 is exhausted from the valve chamber through the passage 52 and the outlet pipe 53 and passes into the reservoir 40. When the valve body 50 is at its opposite limit of travel from that shown in Fig. 9 the pipe 47 will then be in communication with the inlet pipe 43 while fluid will be exhausted from the cylinder 49 through the pipe 48 into the valve chamber and thence through the passage 52 and exhaust pipe 53 to the reservoir 40.

The valve body 50 can also be moved to an intermediate position wherein the lands 51 close both pipes 47 and 48 so that neither of said pipes is in communication with the inlet pipe 43 for a purpose later to be explained. The valve body 50 is provided with a reduced extended valve stem 54 carrying at its outer end a yoke 55 which straddles and is pivotally connected to a valve operating lever 56 which has its lower end pivotally connected to one end of a pair of links 57, the opposite ends of which links are pivotally connected to a bracket 58 formed on the housing of the control valve 44. The yoke 55 and the links 57 are formed of electrically non-conductive material, for a purpose later to be explained.

When the control lever 56 is moved from its most right-hand position to its most left-hand position, as indicated in Fig. 6, the valve body 50 will then be positioned so that pressure fluid is flowing through the pipe 47 into the cylinder 49 and being exhausted from said cylinder through the pipe 48.

When the control lever 56 is moved to a position intermediate its most right-hand and most left-hand positions then the valve body 50 is located in the valve chamber such that the lands 51 close both pipes 47 and 48 and no pressure fluid is flowing to the cylinder 49.

A piston 59 is mounted in the cylinder 49 and has secured thereto a piston rod 60 projecting outwardly of the cylinder and provided inwardly of its outer end with a block 61 fixed thereto and provided on its front and rear sides with vertically arranged grooves 62 in which are located the lower ends of the lever arms 24.

It will thus be seen that movement of the piston 59 in the cylinder 49 effects a rocking of the lever arms 24, with a resultant shifting movement of the cone 20 of the stock feeding and gripping mechanism.

It will be understood that when the pump 38 is operating, the hydraulic system is being supplied with fluid pressure, and the movement of the control lever 56 to either one of its two operative positions controls the movement of the piston 59 in the cylinder 49 and the shifting of the cone 20 of the stock feeding and gripping mechanism into or out of stock gripping position.

As has been stated already, the pump 38 may be of any desired or conventional construction, but it is proposed to use a pump having greater capacity than actually is required, so that the pressure created by the pump will be greater than the maximum pressure required in the hydraulic system.

In order to reduce the output pressure of the pump to the maximum pressure required in the hydraulic system, the control device 42 is employed and this device which is illustrated in detail in Fig. 7 may be designated as a high pressure control device. The output pipe 41 from the pump is connected to the device 42 and communicates by means of a short passage 63 formed in the body of the device with a cylindrical recess 64 located centrally of the body of the device. The recess 64 is in communication by a short passage 65 with the inlet pipe 43 that extends to the control valve 44. The recess 64 of the control device 42 is also in communication with the reservoir 40 by means of an exhaust pipe 66. Normally the communication between the recess 64 and the exhaust pipe 66 is closed by means of a conical valve 67 formed on the lower end of a plunger having an enlarged cylindrical portion 68 that slidably fits the recess 64 and a reduced cylindrical portion 69 that slidably fits a reduced recess 70 located above the recess 64. A spring 71 surrounds the reduced portion 69 of the plunger and has one end abutting the enlarged cylindrical portion 68 and its opposite end the shoulder formed intermediate the recess 64 and the reduced recess 70 and said spring functions to hold the valve 67 seated to close the opening leading to the exhaust pipe 66. A reduced passage 72 communicates with the short passage 63 and this passage 72 is in communication with the recess 64 above the large cylindrical portion 68 of the plunger by means of a laterally extending passage 73. Both sides of the cylindrical portion 68 of the plunger are subject to substantially the same fluid pressure, but since the area of the lower side of the portion 68 is greater than the area of the upper side, the build-up of excessive pressure beneath the plunger will raise the same against the action of the spring 71 and open the valve 67 to bleed the excessive pressure to the reservoir 40 through the pipe 66. The passage 72 is also in communication with the reduced recess 70 above the reduced portion 69 of the plunger, but this communication is controlled by an adjustable needle valve 74.

It will be noted that fluid will be bled past the needle valve 74 in various amounts depending upon the adjustment of said needle valve and that such fluid will pass from the recess 70 through a central passage 75 in the plunger and be bled to the reservoir through the pipe 66. It will be understood that the adjustment of the needle valve 74 determines the maximum pressure to be used in the hydraulic system and that the pressure built up by the pump in excess of this maximum pressure will be bled through the plunger to the reservoir as just stated.

It will also be understood that when the maximum pressure to be used in the hydraulic system has once been determined and the needle valve 74 adjusted accordingly, said valve can then be locked in adjusted position by means of the lock nut 76. The passage 72 is also connected by means of a pipe 77 with a control device 78 shown in elevation in Fig. 4 and in detailed section in Fig. 8.

Figure 5:
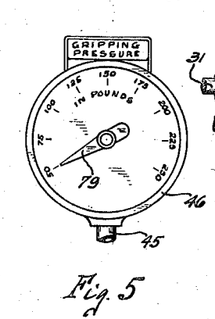
Fig. 5 is a detached elevational view on a larger scale than Fig. 4 of the indicator shown therein for indicating in pounds the gripping pressure of the stock gripping jaws on the work.

Since the indicating device is connected with the pipe 43 it will be seen that the maximum pressure to be used in the hydraulic system, as obtained by the adjustment of the needle valve 74 of the device 42, will act on the indicating device 46 to move the hands 79 in the clockwise direction through a predetermined arc to the graduation on the scale indicated by the numeral 250 in Fig. 5. The numeral corresponding to this graduation and the numerals corresponding to the other graduations on the scale or dial are in terms of the gripping pressure in pounds of the collet jaws on the work as will later be referred to. Inasmuch as the scale graduation adjacent the numeral 250 is reached by the hands 79 under the maximum hydraulic pressure in the system as just explained, such maximum hydraulic pressure will enable a maximum gripping pressure to be applied to the collet jaws of 250 pounds by the stock gripping mechanism already explained. This maximum gripping pressure can be varied down to a minimum of 50 pounds by the control device 78 which will now be explained.

The control device 78 is provided with a passage 80 extending therethrough and formed of a large portion and a reduced portion, as clearly indicated in Fig. 8. The junction of the large and small portions of the passage 80 is regulated in size by means of a needle valve 81 that can be adjustably positioned by turning the knob 82 on the outer end of the stem of said valve. The large portion of the passage 80 is in communication by means of a lateral passage 83 with a pipe 84 that communicates in turn with the exhaust pipe 53 from the main control valve 44.

It will be seen that when the needle valve 81 is completely closed no pressure fluid is bleeding from the high pressure control device 42 through the pipe 77 to the control device 78 which may be designated as a low pressure control device and that, therefore, the hydraulic system will operate under its maximum pressure as determined by the adjustment of the needle valve 74 of the device 42. However, the needle valve 81 can be opened or adjusted so as to bleed the pressure fluid from the device 42 through the pipe 77 and thence through pipe 84 to pipe 53 to the reservoir 40 to reduce the pressure in the hydraulic system below the predetermined maximum pressure, and such reduction in the pressure of the system can be utilized to effect a reduction in the gripping pressure in pounds of the collet jaws on the work by reducing the force applied to the cone to spread the fingers 17. When the needle valve 81 is adjusted to its maximum open position the pressure in the hydraulic system will be at a predetermined minimum pressure which, in the present instance, will give a gripping pressure of 50 pounds of the collet jaws on the work. It will be seen, therefore, that the position of the indicator hand 79 can be varied by the adjustment of the needle valve 81 from a position indicating maximum gripping pressure of 250 pounds down to a position indicating minimum gripping pressure of 50 pounds, wherefore the indicator 46 will indicate the various gripping pressures in pounds of the collet jaws on the work intermediate the minimum and maximum gripping pressures just referred to.

The electric motor 32 which drives the pump 38 is constantly running during the operation of the machine, and the hydraulic system for controlling the stock feeding and gripping mechanism is in turn controlled electrically in a manner which will now be described.

The clutch 37 which connects and disconnects the shaft 36 and the pump 38 is actuated by means of a lever arm 85 pivoted intermediate its ends at 86 and having an extended portion provided with a spherical enlargement 87 located in a slot formed in a core bar 88 common to solenoids 89 and 90, wherefore it will be seen that energization of one or the other of the solenoids 89 and 90 effects an endwise movement of the core bar 88 and, in turn, a rocking movement of the lever 85 to shift the clutch 37.

In Fig. 4 the clutch 37 has been moved to disengaged position by the lever arm 85, while in Fig. 6 the clutch 37 has been moved by the lever arm 85 to engaged position. The extended portion of the lever arm 85 beyond the spherical enlargement 87 is arranged in a slot formed in a switch bar 91 the opposite ends of said bar being provided with double contacts 92 and 93 that cooperate, respectively, with pairs of fixed contacts 94 and 95. The arrangement of the shiftable and fixed contacts just referred to is such that after solenoids 89 and 90 have been energized to shift the core bar 88 and rock the lever arm 85 to move the clutch to engaged or disengaged position, then at the last part of such movement of the lever arm the particular solenoid is deenergized by the disengagement of the movable contacts 92 or 93 from the fixed contacts 94 or 95.

It will be understood that the clutch 37 is so constructed as to have a slight over-travel after it has been moved to engaged position in order to permit the energized solenoid to effect a full engagement of the clutch prior to the completion of the rocking movement of the lever 85, the opening of the switch and the deenergization of said solenoid. The arrangement is such that the pump 38 operates only when hydraulic pressure is required in the hydraulic system to actuate the piston 59, and as soon as such requirement ceases the clutch 37 is disengaged and the operation of the pump terminated. The mechanism whereby this is accomplished will now be explained.

The piston rod 60 at its end beyond the block 61 has fixed thereto a collar 96 located for movement in a shiftable frame 97, see Figs. 2, 3 and 4. The frame 97 is slidably supported in a switch housing 98 which may be mounted in any convenient manner but is illustrated in the present instance as fixed to and carried by one of the supporting bars of the support of the stock feeding and gripping mechanism. The piston rod 60 is slidably supported in an internal boss formed in the housing 98 and also slidably extends through an opening in one end of the frame 97 and constitutes a part of the support for said frame. The opposite end of the frame 97 is provided with an outwardly extending rod 99 located in axial alignment with the piston rod 60 and slidably supported in a boss formed exteriorly of the housing. The rod 99 is provided with a pair of longitudinally spaced notches which cooperate with a spring point 100 (see Fig. 2) to hold the frame in one or the other of the two positions to which it may be shifted.

The frame 97 on the opposite sides thereof is provided with laterally extending supports 101, each of which supports carry two pairs of switch contacts 102, 103 and 104, 105, respectively, as clearly shown in the developed view of Fig. 4, it being understood that in Figs. 2 and 3 said switch contacts are not all visible as certain of the contacts lie behind other of the contacts. The housing 98 internally and on each side thereof is provided with two pairs of fixed contacts 106, 107 and 108, 109, respectively, said pairs of contacts on each side of the housing being spaced longitudinally of the housing and arranged to be engaged by the movable pairs of contacts carried by the frame 97.

The wiring for the electrically operated devices of the operating and control means for the stock feeding and gripping mechanism will now be described.

The wire 110 is connected, in this instance, to the positive side of a source of electrical energy and to the lower end or pivotal point of the operating lever 56 which, as has been stated, is electrically insulated from the parts connected to it. The operating lever 56 is, in part, electrically conductive and is provided with a contact portion 56a which can be brought into engagement with any one of three contacts 111, 112 and 113. The contact 111 is connected to a wire 114 which extends to one of the fixed contacts of the pair of contacts 106 and also to one of the contacts of the pairs of fixed contacts 107. The contact 112 is connected to a wire 115 which extends to the other contact of the pair of contacts 107 and to one of the contacts of the pair of contacts 108. The wire 115 is also connected to the solenoid 90. The contact 113 is connected to a wire 116 which extends to the other contact of the pair of contacts 108 and to one of the contacts of the pair of contacts 109. One of the contacts of each of the pairs of contacts 106 and 109 is not connected to either of the wires 114, 115 or 116 but to a wire 117 which extends to a signal lamp 118 and thence by a wire 119 to a wire 120 connected, in this instance, to the negative side of the source of electrical energy. The wire 117 is connected by a branch wire 121 to one of the contacts of the pair of contacts 94, the other contact of which is connected to one side of the solenoid 89, the opposite side of which solenoid is connected to the wire 120. As already stated, one side of the solenoid 90 is connected to the wire 115 and the other side of this solenoid 90 is connected to one of the contacts of the pair of contacts 95, the other contact of which pair of contacts is connected to the wire 120.

In order to coordinate the description thus far given and to clarify the same a brief resume of the manner in which the operating and control mechanism functions will now be set forth.

Assuming that the stock has been released and the operating lever 56 moved to a neutral position, that is into engagement with contact 112 then the piston 59 in the cylinder 49 will be in the position illustrated in Fig. 4, as will also the various switches of the electrical system. At this time the lands 51 of the main control valve 44 close the conduits 47 and 48 and no pressure fluid can flow to the cylinder 49, it being remembered, however, that at this time the clutch 37 is disengaged and the pump 38 is not operating. Also at this time the cone 20 is in its most right hand position as shown in Fig. 3. When it is desired to grip the stock the operating lever 56 is moved into a position where the portion 56a thereof will be in engagement with the contact 111, which position is illustrated in Fig. 6. At this time current flows through the wire 110, lever 56, wire 114 to one contact of each pair of contacts 106, 107. The one contact of the pair of contacts 107 is dead-ended at this time, while the current flows from one contact of the pair of contacts 106 through the switch contacts 102 to the other contact of the pair and thence through the wire 117 through the light 118 to ground 120 and through the wire 121 to one of the contacts 94, thence through the shiftable contacts 92 and the other contact 94 to the solenoid 89, from whence it flows through wire 120 to the ground, and solenoid 89 is energized. This energization of the solenoid 89 draws the core bar 88 toward the left, as viewed in the drawing, and such movement of the core bar first results in the clutch 37 being engaged to initiate the operation of the pump 38 and then results in disengaging the shiftable contacts 92 from the contacts 94 and engaging the shiftable contacts 93 with the contacts 95, at which time the clutch actuating lever 85 and the solenoid controlling switches associated therewith are in the position shown in Fig. 6. As stated, the pump 38 is now in operation, which fact is indicated by the pilot light 118. The movement of the operating lever 56 into the position shown in Fig. 6 shifts the valve body 50 to its most left hand position, at which time pressure fluid flows through the valve from the inlet conduit 43 and through the conduit 47 to the left hand end of the cylinder 49, it being recalled that the piston 59 is in the position shown in Fig. 4. The pressure fluid flowing into the cylinder 49 causes the piston 59 to travel toward the right and this movement of the piston through the piston rod 60, block 61 and lever 24 shifts the cone 20 from its most right-hand position to its most left-hand position, at which time the fingers 17 are spread apart and the jaws of the collet grip the stock. Also the movement of the cone 20, as just described, causes the sleeve 22 to move toward the left, with the result that the last part of such movement shifts the ratchet bar 26 without imparting any movement to the slide 27. The last part of the movement of the piston 59 toward the right in the cylinder 49 causes the collar 96 on the piston rod 60 to engage with the right hand end of the frame 97 and shifts the same from the position shown in Fig. 4 to the position shown in Fig. 6, at this time the parts being in the position illustrated in Fig. 2. The shifting of the frame 97, as just referred to, moves the contacts 102 and 104 out of engagement with the contacts 106 and 108 and brings the contacts 103 and 105 into engagement with the contacts 107 and 109. At this time the current flows through the wire 110, lever 56, wire 114 across contacts 107 to wire 115 and thence through solenoid 90 and across switch contacts 95 which are engaged by the shiftable contacts 93 and thence to wire 120 to ground. Thereafter solenoid 90 is energized, with the result that the core bar 88 is moved from the position shown in Fig. 6 to the position shown in Fig. 4, resulting in a disengagement of the clutch 37, after which the shiftable contacts 93 are disengaged from the contacts 95 and the shiftable contacts 92 engage with the contacts 94. The disengagement of the clutch 37 stops the pump 38 and hence the flow of pressure fluid through the hydraulic system, while the disengagement of the shiftable contacts 93 from the contacts 95 interrupts the circuit through the pilot light 118 to indicate that the pump is not operating. At this time, as has been stated, the operating lever 56 is in the position shown in Fig. 6 and the parts of the stock feeding and gripping mechanism are in the position indicated in Fig. 2, at which time the collet jaws are gripping the work. When it is desired to release the stock and feed the same upon the completion of the work thereon, the lever 56 is moved from the position shown in Fig. 6 to the position shown in Fig. 4, at which time the portion 56a of the lever is in engagement with the contact 113. At this time current will flow through the wire 110, lever 56, wire 116, to one contact of the pair of contacts 109 and to one contact of the pair of contacts 108. At this time the frame 97 is in the position shown in Fig. 6 and the shiftable contacts 105 are in engagement with the contacts 109, wherefore the current flows across contacts 109 and then by wire 117 through the pilot light 118 to ground 123, and also by the wire 121 to one of the contacts 94, which at this time is engaged by the shiftable contact 92 as shown in Fig. 4, as has already been mentioned. Thereafter the current flows across the contacts 94 through the solenoid 89 and thence to ground through the wire 120. The result is the solenoid 89 is energized, the core bar 88 moved from the position shown in Fig. 4 to the position shown in Fig. 6, with the result that the clutch 37 is first engaged and then the shiftable contacts 92 disengaged from the contacts 94 and the shiftable contacts 93 engaged with the contacts 95. The engagement of the clutch 37 again starts the pump 38 in operation and hence pressure fluid may flow through the hydraulic system. The movement of the operating lever into engagement with the contact 113 also shifts the valve body 53 of the valve 44 to its most right-hand position as viewed in Fig. 9, wherefore pressure fluid flows through the valve and through pipe 48 into the right hand end of the cylinder 49, with the result that the piston 59 is moved toward the left. This movement of the piston 59 results in the cone 20 being moved out of engagement with the fingers 17 to release gripping engagement of the collet jaws upon the stock and to cause the cone to move into the position shown in Fig. 3 to enable the sleeve 22 to move the ratchet bar 26 in a stock feeding direction, that is, to move the slide 27 toward the right. The last part of the movement of the piston 59 toward the left in the cylinder 49 causes the collar 96 on the piston rod 60 to engage with the left-hand end of the frame 97 to shift said frame from the position shown in Fig. 6 to the position shown in Fig. 4 and to disengage the shiftable contacts 103 and 105 from the contacts 107 and 109 while bringing the contacts 102 and 104 into engagement with the contacts 106, 108, at which time current will flow through wire 116 across contacts 108 and thence by wire 115 to the solenoid 90, it being understood that the shiftable contacts 93 of the solenoid switch are in engagement with the contacts 95 as indicated in Fig. 6, wherefore the solenoid 90 is energized to draw the core bar 88 from the position shown in Fig. 6 into the position shown in Fig. 4, with the result that the clutch 37 is disengaged, the pump 38 stopped and the shiftable contacts 93 disengaged from the contacts 95, wherefore the circuit through the solenoid 90 is interrupted and the same is deenergized.

After the stock has been released, as just explained, the operating lever 56 may be moved either to engagement with contact 111 to again effect a gripping of the stock, or it may be moved into an intermediate position in engagement with the contact 112 to neutralize the control valve 44, at which time the electrical circuit through the wiring will be dead-ended and no movement of the parts effected.

Assuming that the stock feeding and gripping mechanism has been operating with a gripping pressure of two hundred pounds of the collet jaws on the work and it is desired to operate the mechanism with a gripping pressure of one hundred pounds for a different work piece, the operator will adjust the needle valve 81 of the control device 78 to reduce the pressure in the hydraulic system to that desired. He then makes a trial adjustment of the fingers 17 and sleeve 15 by loosening the screw 19 and rotating the finger support 18 on the spindle to change the relationship between the heels of the fingers and the end of the sleeve 15, so that the complete spreading movement of the fingers will effect a lesser endwise pressure of the sleeve 15 than was required for the gripping pressure of two hundred pounds. He then moves the operating lever 56 into position so that the operating and control mechanism functions to bring the cone into engagement with the fingers to spread the same and cause the collet jaws to grip the stock. The operator observes the indicator 46 and the cone and fingers to determine if the fingers are fully spread when the hand 79 of the indicator is at the graduation 100. If the fingers are not fully spread at this time he will know that the cone 20 has not moved its complete distance toward the left and that it is necessary for the pressure to build up in the cylinder 49 to effect such complete movement of the cone. The operator can determine from the indicator 46 the pressure required to move the cone to its full left hand position and from such determination the approximate amount of further adjustment require, if any, to vary the relationship between the fingers 17 and the end of the sleeve 15. Thereafter the operator, by trial, can adjust the parts of the stock gripping mechanism until the indicator 46 will indicate one hundred pounds pressure when the fingers 17 have been fully spread by the cone 20 and the stock gripped.

It will be understood that when the cone 20 has been moved to its most left hand position and after the fingers 17 have been completely spread, pressure will not build up in the hydraulic system, since by the time the cone reaches its most left-hand position the electrical control system functions to disengage the clutch 37 and stop the operation of the pump 38. Consequently the pressure indicated by the hand 79 of the indicator 46 will correspond to the gripping pressure of the collet jaws on the work piece.

It will have been seen from the foregoing description that the operating and control mechanism is such that although the gripping or releasing of the stock is initiated manually by the operator, the further functioning of the mechanism is entirely automatic due to the arrangement of the elecarical and hydraulic systems, wherein the solenoids of the former automatically control the engagement and disengagement of the clutch that, in turn, controls the starting and stopping of the pump to render the hydraulic system effective or ineffective. In other words, the functioning of the electrical system is initiated by the operator, and said system in turn automatically initiates the operation of the hydraulic system and this latter system then functions automatically to operate the electrical system to terminate the operation of the hydraulic system and after such termination of the operation of the hydraulic system the electrical system automatically becomes inoperative.

Although a preferred embodiment of the invention has been illustrated and described herein, it will be understood that the invention is susceptible of various modifications and adaptations within the scope of the appended claims.

Having thus described my invention, I claim:

1. In a stock feeding and gripping mechanism for a machine tool and including a movable actuator, pressure fluid operated means for moving said actuator, a pump for supplying pressure fluid to said means, electrical means for controlling the starting and stopping of said pump, and a single device for directly controlling the direction of operation of said pressure fluid operated means and for controlling said electrical means.

2. In a stock feeding and gripping mechanism for a machine tool and including a shiftable actuator, pressure fluid operated means for moving said actuator, a pump for supplying pressure fluid to said means, electrical means for controlling the starting and stopping of said pump, manually operated means for controlling said electrical means to start the operation of said pump, and means controlled by said pressure fluid operated means and effective to control said electrical means in stopping the operation of said pump.

3. In a stock feeding and gripping mechanism for a machine tool and including a movable actuator, pressure fluid operated means for moving said actuator, a pump for supplying pressure fluid to said means, a valve controlling the direction of operation of said means, and an electrical system operatively associated with said valve for controlling the starting and stopping of said pump and including means effective to start the operation of said pump upon the setting of said valve for operation of said pressure fluid operated means in one direction, and means automatically controlled by the pressure fluid operated means for stopping the operation of said pump upon completion of the movement of said actuator.

4. In a stock feeding and gripping mechanism for a machine tool and including a movable actuator, pressure fluid operated means for moving said actuator, a pump for supplying pressure fluid to said means, an electrical system for controlling the starting and stopping of said pump and including a manually controlled switch for starting said pump and a switch automatically controlled by said pressure fluid operated means for stopping the operation of said pump.

5. In a stock feeding and gripping mechanism for a machine tool and including a movable actuator, pressure fluid operated means for moving said actuator in opposite directions, a pump for supplying pressure fluid to said means and an electrical system for controlling the starting and stopping of said pump and including a manually operated switch for controlling the starting of said pump, and a switch automatically controlled by the movement of said means in opposite directions for controlling the stopping of said pump.

6. In a stock feeding and gripping mechanism for a machine tool and including a movable actuator, pressure fluid operated means for moving said actuator in opposite directions, a pump for supplying pressure fluid to said means, and an electrical system for controlling the starting and stopping of said pump and including a manually operated switch for controlling the starting of said pump and a switch automatically controlled by the movement of said means in opposite directions for controlling the stopping of said pump, and a valve operatively associated with said manually controlled switch for controlling the direction of operation of said pressure fluid operated means.

7. In a stock feeding and gripping mechanism for a machine tool and including a movable actuator, pressure fluid operated means for moving said actuator, a pump for supplying pressure fluid to said means, a clutch for connecting and disconnecting said pump to a power source, electrical means for controlling said clutch and including a manually operated switch that controls the engagement of said clutch and a switch automatically operated by said pressure fluid operated means and which controls the disengagement of said clutch.

8. In a stock feeding and gripping mechanism for a machine tool and including a movable actuator, pressure fluid operated means for moving said actuator, a pump for supplying pressure fluid to said means, a clutch for connecting and disconnecting said pump to and from a power source, and means for controlling said clutch and including a solenoid for effecting engagement of said clutch, a manually operated switch controlling said solenoid, a second solenoid for effecting disengagement of said clutch, and a switch automatically controlled by said pressure fluid operated means for controlling said second solenoid.

9. In a stock feeding and gripping mechanism for a machine tool and including a movable actuator, pressure fluid operated means for moving said actuator, a pump for supplying pressure fluid to said means, a clutch for connecting and disconnecting said pump to and from a power source, and means for actuating and controlling said clutch and including a lever operatively associated with said clutch, solenoids for moving said lever in opposite directions, switches for controlling the energization of said solenoids, means operatively connecting said switches with said lever such that upon the completion of the movement of said lever to effect an engagement or disengagement of the clutch the switch controlling the solenoid which effected such movement is automatically opened and the switch controlling the other solenoid is automatically closed, an electrical circuit for supplying energy to said solenoids, and switch means automatically controlled by said pressure fluid operated means to control the electrical circuits through said solenoids.

10. In a stock feeding and gripping mechanism for a machine tool and including a movable actuator, pressure fluid operated means for moving said actuator, a pump for supplying pressure fluid to said actuator, a clutch for connecting and disconnecting said pump to and from a source of power, a lever for actuating said clutch to cause engagement and disengagement thereof, and means for operating said lever and including a pair of solenoids for moving said lever in opposite directions, and an electrical system for controlling the energization of said solenoids and comprising a pair of switches operatively associated with said lever such that completion of the movement of said lever in each direction automatically opens the switch controlling the solenoid that has effected such movement and closes the switch controlling the other solenoid, an electrical circuit for supplying electrical energy to said solenoids, a manually operated switch arranged in said circuit for controlling the energization of the solenoid that effects engagement of said clutch, and a second switch arranged in said circuit and automatically controlled by the movement of said pressure fluid operated means to control the energization of the solenoid that effects disengagement of said clutch.

11. In a stock feeding and gripping mechanism for a machine tool and including a movable actuator, pressure fluid operated means for moving said actuator, means of regulating said pressure fluid operated means to cause the same to impart different pressures upon said actuator and in turn to effect different gripping pressures of the mechanism upon the work, an indicating means associated with said last named means for indicating the pressure of the pressure fluid operated means upon said actuator in terms correlated to the gripping pressure of said mechanism on the work.

12. In a stock gripping and feeding mechanism for a machine tool and including a movable actuator, a pressure fluid operated motor for moving said actuator and including a piston and piston rod, a pump for supplying pressure fluid to said motor, and control means for starting and stopping said pump and including an electrical system having a multiple switch, and means operatively associating said switch with said piston rod such that said switch is automatically actuated during the latter part of the movement of said piston of said motor in opposite directions.

13. In a stock gripping and feeding mechanism for a machine tool and including a movable actuator, a pressure fluid operated motor for moving said actuator and including a piston and piston rod, a pump for supplying pressure fluid to said motor, and control means for starting and stopping said pump and including an electrical system having a multiple switch, and means operatively associating said switch with said piston rod such that said switch is automatically actuated during the latter part of the movement of said piston of said motor in opposite directions, said electrical system also having a manually operated switch that renders the system effective for starting said pump while said multiple switch automatically renders said system effective for stopping said pump.

14. In a stock feeding and gripping mechanism for a machine tool a movable actuator, adjustable means operated by the movement of said actuator to grip the stock, fluid operated means for moving said actuator including a dial operatively connected to said means for indicating the fluid pressure in terms correlated to the gripping pressure of said adjustable means upon the stock whereby the adjustable means may be readily adjusted to cause the stock to be gripped at a predetermined gripping pressure.

15. In a stock feeding and gripping mechanism for a machine tool, means for gripping the stock, fluid operating means for actuating said gripping means, and means operatively associated with said second named means for indicating the fluid pressure thereof in terms correlated to the pressure of the gripping means on the stock.

16. In a stock gripping mechanism having stock gripping jaws and means for actuating said jaws; a movable actuator for said means, a fluid motor operatively associated with said actuator, a source of pressure fluid, operative connections between said motor and said source including a control valve, electromotive means operatively associated with said source and actuatable to render said source active or inactive, a control member operatively associated with said valve for actuating the latter, operative connections between said member and said electromotive means whereby actuation of said valve by said member also effects actuation of said electromotive means to render said source of pressure fluid active, and control means operatively associated with said motor and said electromotive means for effecting automatic actuation of the latter to render said source of pressure fluid inactive after a predetermined operation of said motor.

CLARENCE J. BALLASH.